March 29, 1966 A. M. BLOOM 3,243,136

REEL CONSTRUCTION

Filed Oct. 16, 1963

INVENTOR.
ALBERT BLOOM
BY
OSTROLENK, FABER, GERB & SOFFEN
ATTORNEYS

United States Patent Office 3,243,136

Patented Mar. 29, 1966

3,243,136

REEL CONSTRUCTION

Albert M. Bloom, 620 W. 239th St., Riverdale, Bronx, N.Y.

Filed Oct. 16, 1963, Ser. No. 316,720
4 Claims. (Cl. 242—71.8)

The present invention relates to a reel for receiving and winding thereon a continuous ribbon-like material such as magnetic recording tape or the like, and more particularly to a reel which facilitates simplified threading of such a tape.

Numerous forms of reel constructions are known to facilitate threading and winding recording tapes upon the outer peripheries of the component hubs thereof. Most such constructions have involved various mechanisms for securing one end of the tape to the reel, the subsequent rotation of the reel winding the tape thereon. Hence in United States Patent 2,954,941, for example, a device is described including a fixed post element integrally molded on the reel, for engaging a loop formed at the end of the tape, the tape being threaded through an appropriate narrow slot formed in one of the face flanges of the reel prior to initiating rotation of the reel.

It is among the objects of the present invention to provide a reel construction which facilitates simpler and more rapid threading and winding of ribbon-like materials such as recording tape thereon.

A further object of the invention is to provide such a construction which simplifies mounting and engaging the reel upon the drive shaft or spindle of the driving mechanism utilized therefor.

Yet another object of the invention is to provide such a construction which may be utilized in association with, for example, conventional recording tapes having free ends, or with tapes having pre-formed ends.

Figure 1:
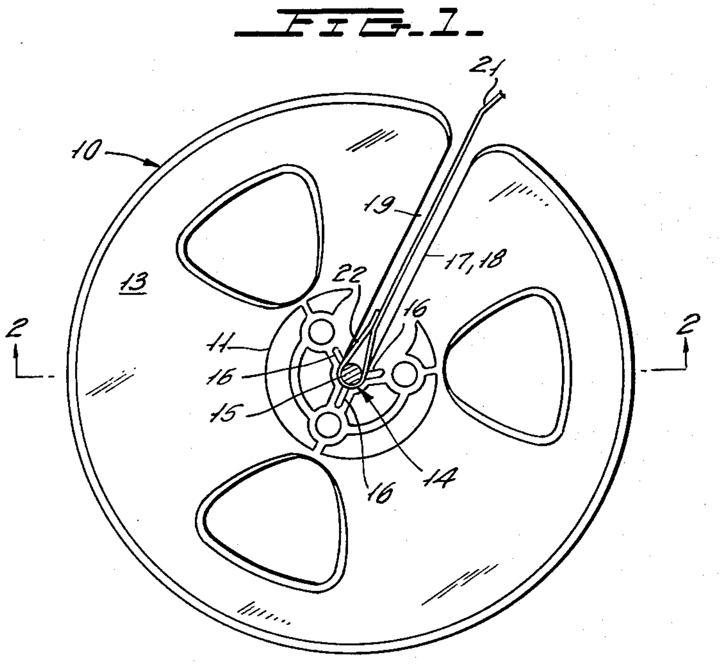
Figure 2:
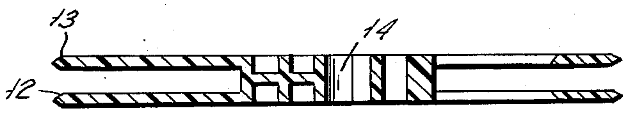

These and other objects of the invention will be readily apparent from the following description of a preferred embodiment thereof taken in connection with the accompanying drawing in which:

FIGURE 1 is a plan view of a reel for receiving magnetic recording tape in accordance with a preferred embodiment of the invention; and FIGURE 2 is a sectional view taken along the line 2—2 in FIGURE 1.

The reel construction of the invention comprises a hollow cylindrical hub having a pair of face flanges at opposite ends thereof, a drive spindle aperture extending concentrically of and between the face flanges and a pair of aligned, radially extending threading slots provided in such flanges. The threading slots communicate at their outer ends with the peripheries of the face flanges and at their inner ends with the drive spindle aperture, and have widths sufficient to permit mounting of the reel on the drive spindle by movement of the reel laterally relative to the spindle, with the latter aligned with and extending through the threading slots to guide the reel into position with the drive spindle received in the aperture therefor.

A magnetic recording tape or other ribbon-like material may readily be wound upon the reel by initially engaging the tape with the drive spindle prior to mounting the reel thereon, the subsequent rotation of the reel on the spindle effecting self-winding of the tape thereon.

Turning to the drawing, a reel 10 is illustrated comprising a hollow cylindrical hub 11 having a pair of spaced annular face flanges 12 and 13 secured to the opposite ends thereof. An aperture 14 is provided concentrically of the face flanges 12 and 13 extending therethrough and adapted to receive a drive spindle 15 provided in the conventional manner with key members 16 which engage mating slots defined by the walls of aperture 14. The drive spindle may, in known manner, be a part of the actuating mechanism of a tape recorder or similar device.

A pair of threading slots 17 and 18 are provided in the respective face flanges 12 and 13, respectively, extending through the face flanges and defining a radial passageway 19 communicating at its outer end with the peripheries of the flanges and at its inner end with the spindle receiving aperture 14. The widths of slots 17 and 18 are such that the passageway 19 can accommodate the spindle 15 and permit relative motion between the spindle and the reel 10, as described more fully hereinafter.

The manner in which the reel 10 is mounted on the drive spindle 15 and a recording tape wound thereon is illustrated in FIGURE 1 in connection with a tape 21 having a pre-formed closed loop 22 at its end.

The tape 21 is initially engaged with the drive spindle 15 by simply passing the loop 22 thereover, the tape being manually held outwardly from the drive spindle slightly spaced from the plane defined by the upper edges of the key members 16 thereof. The reel 10 is thereafter mounted upon the spindle 15 by moving the reel laterally relative to such spindle from a position opposite from that at which the tape is held, the spindle guiding the threading slots 17 and 18, and thus the reel, into the position illustrated with aperture 14 aligned with the spindle.

The reel 10 is thereafter moved longitudinally relative to the drive spindle 15 to engage the key members 16 with the mating slots in the reel and complete mounting of the reel upon the drive spindle. In order to wind the tape 21 upon the spindle 15 is then actuated, rotation of the reel automatically effecting self-winding of the tape 21 about the outer periphery of the hollow hub 11.

It will be understood that a tape having a free end rather than a pre-formed end loop 22 may similarly be threaded and wound on the reel structure of the present invention. In such case the free end of the tape is looped over the drive spindle 15, the loop being manually held at a point spaced from the spindle. Upon mounting the reel 10 upon the drive spindle, in the manner described hereinabove, and effecting rotation of the reel, the tape is wound about the periphery of the hub 11, the free end of the tape being engaged by the frictional restraint of the body portion of the loop initially formed, upon contact with the periphery of hub 11.

It will be apparent from the preceding description that the reel construction of the present invention facilitates threading and winding magnetic recording tape or other ribbon-like material upon a take-up reel by simply winding the tape about a fixed drive spindle prior to mounting the reel thereon, thereby elminiating the necessity for manually threading the tape upon the reel employing structural elements integral with or otherwise secured to the reel and requiring manual dexterity of the user.

The reel of the present invention is desirably constructed of a molded, transparent plastic material. However, the reel may be constituted of other materials, and may be transparent or otherwise, in accordance with the desires of the user. Since these and various other modifications may be made without departing from the scope of the invention it is intended that the foregoing description is illustrative only and should not be taken in a limiting sense.

I claim:

1. A reel for receiving and winding thereon a continuous ribbon-like material, which comprises a hollow cylindrical hub having a pair of face flanges at opposite ends thereof, a drive spindle aperture extending axially of said hub between said face flanges for receiving and engaging a drive spindle capable of rotating said reel, and at least one threading slot provided in one of said face flanges and communicating at its outer end with the periphery of said flange and at its inner end with said drive spindle aperture, said threading slot having a width throughout its entire length sufficient to permit lateral movement of the reel relative to the drive spindle with the spindle extending through the threading slot from a first position with the spindle disposed adjacent the periphery of said flange to a second position with the spindle disposed in alignment with and through the drive spindle aperture.

2. The reel as defined in claim 1, in which aligned, radially extending threading slots are provided in both of said face flanges.

3. A reel for receiving and winding thereon a magnetic recording tape, which comprises a hollow cylindrical hub having a pair of face flanges at opposite ends thereof, a drive spindle aperture extending axially of said hub between said face flanges for receiving and engaging a drive spindle capable of rotating said reel, said aperture defining a plurality of slots for receiving and engaging mating members on a drive spindle to facilitate rotation of said reel, and a pair of aligned, radially extending threading slots provided in said face flanges and communicating at their inner ends with said drive spindle aperture, said threading slots having widths throughout their entire lengths sufficient to define a passageway facilitating lateral movement of the reel relative to the drive spindle with the latter extending through said passageway from a first position with the spindle disposed adjacent the periphery of said flanges to a second position with the spindle disposed in alignment with and through the drive spindle aperture; said reel thereby facilitating self-winding of the recording tape about the periphery of said hollow hub upon initial engagement of the tape with the drive spindle upon which the reel is adapted to be mounted.

4. A reel for receiving and winding thereon a continuous ribbon-like material, which comprises a hollow cylindrical hub having a pair of face flanges at opposite ends thereof, a drive spindle aperture extending axially of said hub between said face flanges for receiving and engaging a drive spindle capable of rotating said reel, and at least one threading slot provided in one of said face flanges and communicating at its outer end with the periphery of said flange and at its inner end with said drive spindle aperture, said threading slot having a width throughout its entire length substantially equal to the diameter of said drive spindle aperture for permitting lateral movement of the reel relative to the drive spindle with the spindle extending through the threading slot from a first position in which the spindle is disposed at the periphery of said flange to a second position in which the spindle is disposed in alignment with and through the drive spindle aperture.

References Cited by the Examiner

UNITED STATES PATENTS

| | | | |
|---|---|---|---|
| 2,225,921 | 12/1940 | Murdock | 242—55 |
| 2,759,677 | 8/1956 | Speed | 242—55 |
| 2,974,892 | 3/1961 | Geloso | 242—71.8 |
| 3,104,848 | 9/1963 | Joffe | 242—71.8 |

JORDAN FRANKLIN, *Primary Examiner.*

M. J. COLITZ, J. R. BOLER, *Assistant Examiners.*